United States Patent
Hsiao et al.

(10) Patent No.: US 7,274,494 B2
(45) Date of Patent: *Sep. 25, 2007

(54) HEIGHT ADJUSTMENT STRUCTURE

(75) Inventors: Chun-I Hsiao, Hsinchu (TW); Tsung-Yin Chen, Hsinchu (TW)

(73) Assignee: Transpacific IP., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/288,662

(22) Filed: Nov. 28, 2005

(65) Prior Publication Data

US 2006/0077481 A1    Apr. 13, 2006

Related U.S. Application Data

(63) Continuation of application No. 09/962,712, filed on Sep. 24, 2001, now Pat. No. 6,992,802.

(51) Int. Cl.
*H04N 1/04* (2006.01)
*G06K 7/10* (2006.01)

(52) U.S. Cl. .............. 358/474; 358/475; 358/496; 235/468

(58) Field of Classification Search ........... 358/474, 358/475, 496, 497; 235/468, 467
See application file for complete search history.

(56) References Cited

U.S. PATENT DOCUMENTS 4,645,336 A * 2/1987 Muehlenbruch ............ 355/61
5,191,222 A 3/1993 Edwards et al.
5,463,213 A * 10/1995 Honda ..................... 235/468
5,841,121 A 11/1998 Koenck
5,969,795 A * 10/1999 Honda ....................... 355/25
6,493,469 B1 * 12/2002 Taylor et al. .............. 382/284

* cited by examiner

*Primary Examiner*—Jerome Grant
*Assistant Examiner*—Houshang Safaipour
(74) *Attorney, Agent, or Firm*—Marger, Johnson & McCollom, P.C.

(57) ABSTRACT

A height adjustment structure for an image-scanning device. The scanning device has a guiding rod, an optical system and a document panel. The guiding rod and the document panel are fixed relative to each other. The optical system includes a box body and an axial rod bearer that can slide along into the guiding rod. The height adjustment structure includes a first positioning section and a second positioning section. The first positioning section is attached to one side of the box body and the second positioning section is attached to one side the axial rod bearer that faces the first positioning section. The first positioning section and the second positioning section has hooking mechanism, screwing mechanism or teeth-meshing mechanism for fixing the box body relative to the axial rod bearer and hence setting the distance from the box body to the document panel.

9 Claims, 6 Drawing Sheets

HEIGHT ADJUSTMENT STRUCTURE

This is a Continuation Patent Application of U.S. patent application Ser. No. 09/962,712, filed Sep. 24, 2001 now U.S. Pat. No. 6,992,802, titled, "Height Adjustment Structure" by Chun-I Hsiao et al, assigned to the assignee of the presently claimed subject matter.

BACKGROUND OF THE INVENTION

1. Field of Invention

The present invention relates to a height adjustment structure. More particularly, the present invention relates to a height adjustment structure inside a scanning device for adjusting distance of separation between an optical system and a document holder panel.

2. Description of Related Art

As a result of the rapid advances in multimedia software, network connection and computer technologies, the scanner has become an indispensable peripheral device for a computer system. In general, a platform-type scanner includes an optical system and a driving device. Through the driving device, the chassis housing the optical system is driven so that a sensor in the optical system may scan the image on a document in steps and turn the scanned image into electronic signals. Normally, the optical sensor is a charge-coupled device (CCD).

Figure 1:
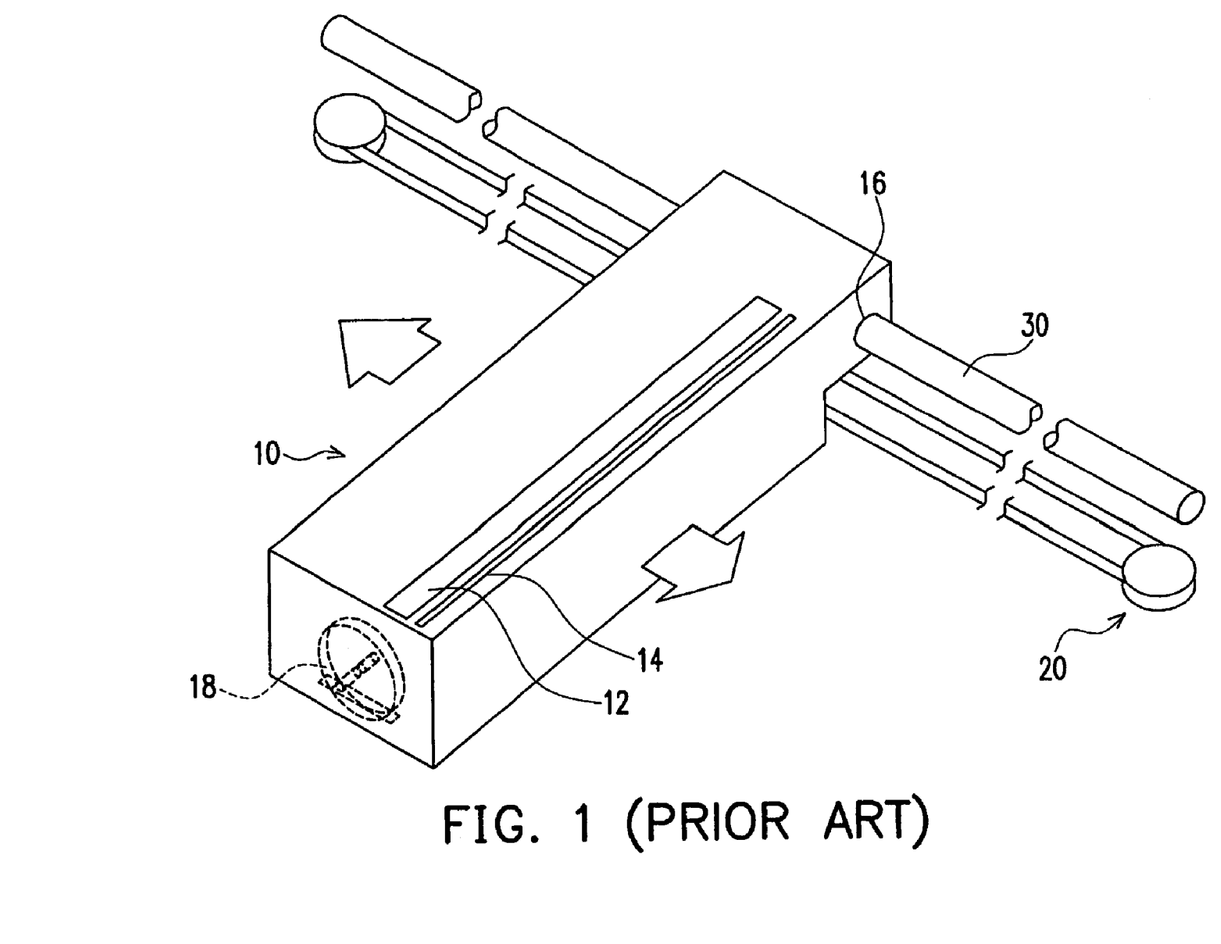
FIG. 1 is a perspective view showing a guiding rod, a driving device and an optical system in a conventional platform-type scanner.
Figure 2:
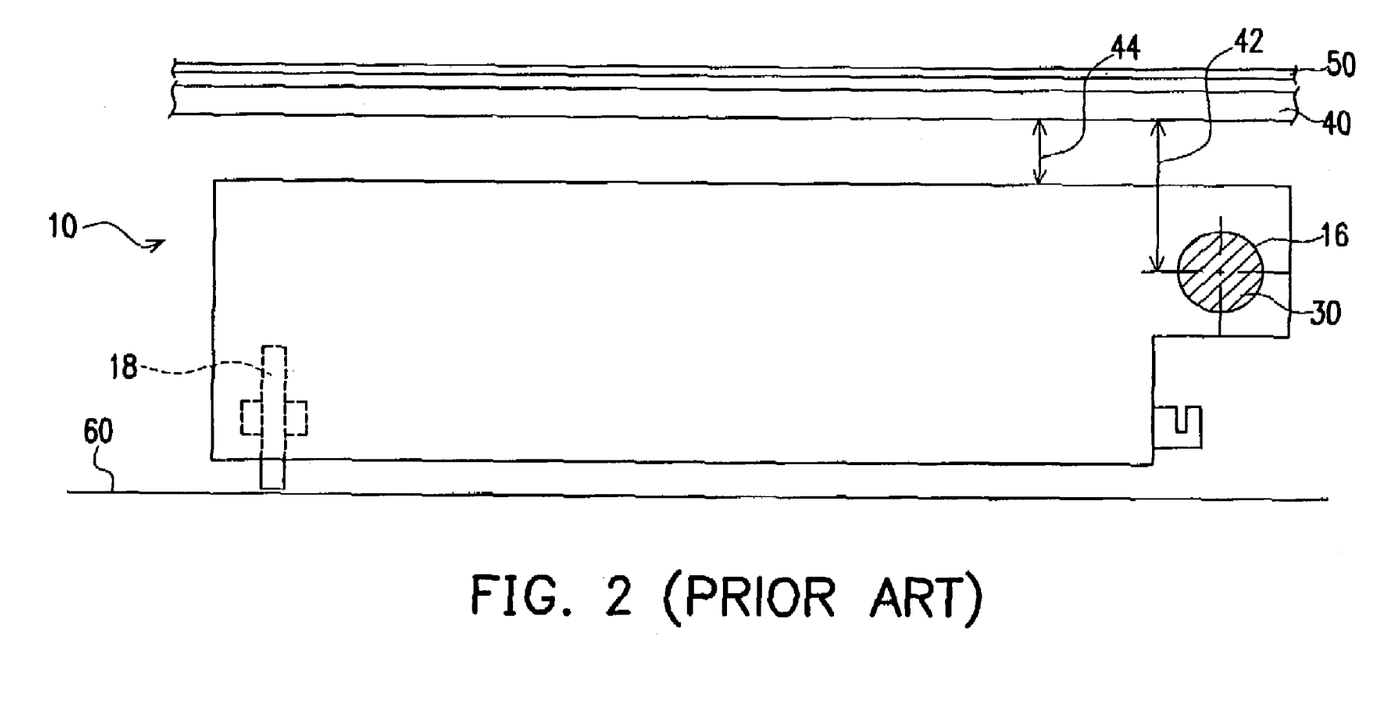
FIG. 2 is a side view of the document holder, the guiding rod and the optical system in the conventional platform-type scanner.

FIG. 1 is a perspective view showing a guiding rod, a driving device and an optical system in a conventional platform-type scanner. FIG. 2 is a side view of the document holder, the guiding rod and the optical system in the conventional platform-type scanner. As shown in FIG. 1, a light source 12 and a slit 14 are positioned over the optical system 10. Light from the light source 12 penetrates a transparent document panel 40 to arrive at the surface of a document 50. After reflection, the reflected light passes through the slit 14 and enters the optical system 10 for image processing. By driving transmission device 20 forward slowly, the optical system 10 advances in steps until the entire document 50 is scanned.

Since the optical system 10 must advance in a preset direction linearly with precision to avoid image distortion, the optical system 10 needs to follow a guiding rod 30. Hence, the chassis that houses the optical system has a positioning hole 16 for sliding along the guiding rod 30. As shown in FIG. 2, the transmission device 20 drives one side of the chassis. Therefore, a roller 18 is installed on the other side of the chassis so that the document 50 on the panel 40 can move in parallel and prevent any tilting of the optical system 10.

In general, an optical system includes a light source, a reflecting mirror, transparent lenses and an optical sensor. All these components are housed inside a chassis. Hence, for similar design, the lens inside the optical system must have a fixed object distance. However, for different types of platform scanner design, distance 42 from the document panel 40 to the guiding rod 30 may be slightly different. Consequently, distance 44 from the optical system 10 to the document panel 40 needs to be adjusted so that the document 50 is in proper focus with respect to the object distance of the lens system (not shown) inside the optical system 10. In other words, the distance from the document panel 40 to the lens inside the optical system 10 must be properly set in each design. Since the distance must be carefully set for each scanner design, production and design cost are greatly increased.

SUMMARY OF THE INVENTION

Accordingly, one object of the present invention is to provide a height adjustment structure. Height adjustment is achieved by redesigning the external housing of the optical system. The housing comprises two separate units including a box body and an axial rod bearer such that distance between the box body and the document panel can be adjusted to match different type of platform design.

To achieve these and other advantages and in accordance with the purpose of the invention, as embodied and broadly described herein, the invention provides a height adjustment structure for an image scanning device. The structure can be roughly divided into a first positioning section and a second positioning section on one side of the box body and the axial rod bearer, respectively. The first and the second positioning section may be engaged by a latching mechanism, screwing mechanism or teeth-lock mechanism. Relative distance from the box body of the optical system to the axial rod bearer can be adjust by moving vertically before fixing the two using any one of the aforementioned engaging mechanisms, thereby obtaining an optical distance of separation between the box body and the document panel.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
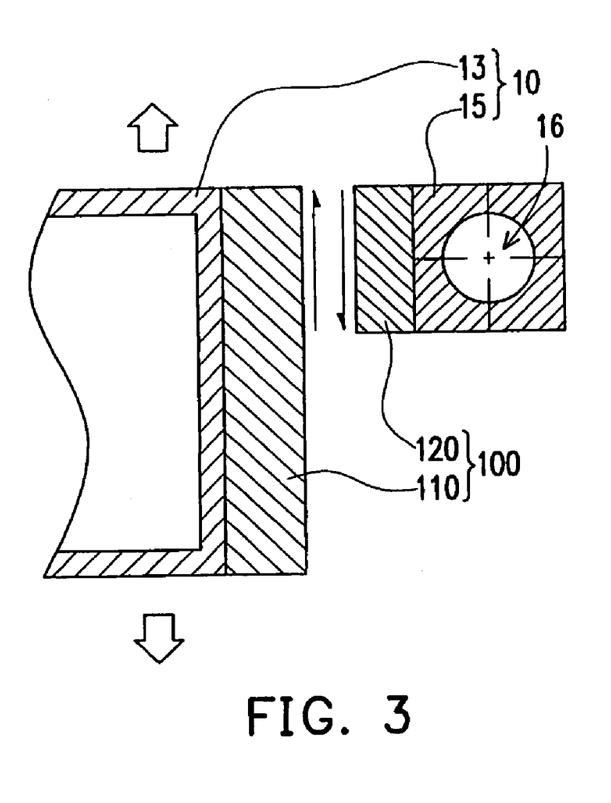
FIG. 3 is a schematic cross-sectional diagram showing a height adjustment structure according to this invention.

To adjust the distance between the optical system and the document panel (as shown in FIG. 2), a height adjustment structure is introduced in this invention. FIG. 3 is a schematic cross-sectional diagram showing a height adjustment structure according to this invention. As shown in FIG. 3, an optical system 10 structure comprises two major parts, a box body 13 and an axial rod bearer 15. The box body 13 houses the major components of the optical system 10 including, for example, a light source, a set of reflecting mirrors, a set of lenses, an optical sensor and so on. The axial rod bearer 15 includes a positioning hole 16 into which is slid a guiding rod 30 such as the one shown in FIGS. 1 and 2. Driven by a transmission device 20, the axial rod bearer 15 moves along the axis of the guiding rod 30 linearly and horizontally. In addition, the height adjustment structure 100 also includes a first positioning section 110 and a second positioning section 120. The first positioning section 110 is attached to one side of the box body 13 and the second positioning section 120 is attached to a corresponding side of the axial rod bearer 15. The first position section 110 and the section position section 120 may move vertically up or down before being fixed relative to each other by a locking mechanism such as a latching structure, a screwing structure or a teeth-engage structure. In this invention, the first embodiment illustrates a latching structure, the second embodiment illustrates a screwing structure and the third embodiment illustrates a teeth-engage structure.

Figure 4:
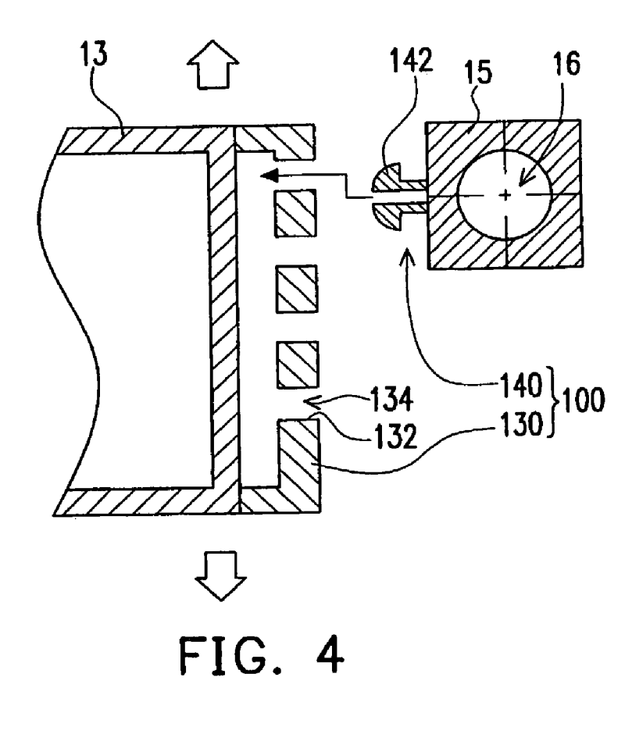
FIG. 4 is a schematic cross-sectional diagram showing a height adjustment structure according to a first embodiment of this invention.

FIG. 4 is a schematic cross-sectional diagram showing a height adjustment structure according to a first embodiment of this invention. The first positioning section 130 is mounted on the side of the box body 13 that corresponds to the axial rod bearer 15. The first positioning section 130 has a plurality of plugging slots 132 each having an opening. The plugging slots 132 are located on the exterior facing side of the first positioning section 130 and laid along the vertical direction from bottom to top. The second positioning section 140 is mounted on the side of the axial rod bearer 15 that corresponds to the box body 13. The second positioning section 140 has a gripping hook 142 that can engage with one of the plugging slots 132 on the first positioning section 130. The first positioning section 130 and the box body 13 may be fabricated together as a single component or locked together with screws. Similarly, the second positioning section 140 and the axial rod bearer 15 may be fabricated together as a single component or may be locked together with screws.

As shown in FIGS. 2 and 4, distance from the guiding rod 30 to the document panel 40 is normally fixed. If the hook 142 engages with a plugging slot 132 in the lower portion of the first positioning section 130, the box body 13 is raised, thereby shortening the distance 44 from the optical system 10 to the document panel 40. Conversely, if the hook 142 engages with a plugging slot 132 in the upper portion of the first positioning section 130, the box body 13 is lowered thereby increasing the distance 44 from the optical system 10 to the document panel 40. In the meantime, the roller 18 or height of the underside 60 must be adjusted to match the adjusted box body 13 so that tilting of the box body 13 is prevented.

Hence, by plugging the hook 142 into different plugging slots 132, relative distance 44 in the vertical direction between the box body 13 and the axial rod bearer 15 can be adjusted. Ultimately, surface of a document 50 falls on the exact object distance of the internal lenses (not shown) inside the optical system 10. Thus, there is no need to redesign the assembly once another type of optical system is installed. In addition, manual assembly of the box body 13 with the axial rod bearer 15 is very much simplified and assembling speed is thereby increased because the hook 142 may engage into a specific plugging slot 132 for each type of optical system.

Figure 5:
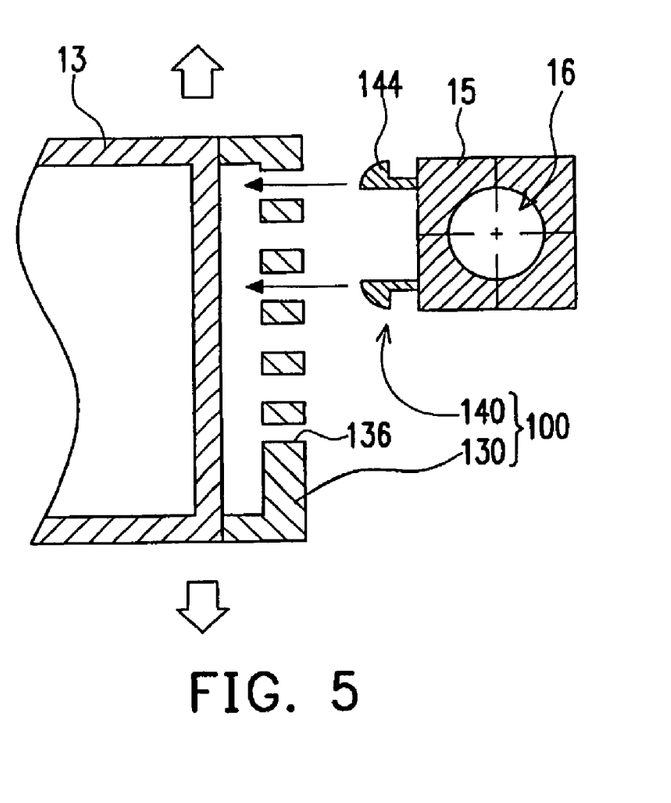
FIG. 5 is a schematic cross-sectional diagram showing an alternative height adjustment structure according to the first embodiment of this invention.

FIG. 5 is a schematic cross-sectional diagram showing an alternative height adjustment structure according to the first embodiment of this invention. As shown in FIG. 5, the second positioning section 140 of the height adjustment structure 100 has two or more hooks 144 that can be plugged into some of the plugging slots 136 for a higher structural strength. In addition, the number of plugging slots 136 can also be increased to extend the range of adjustment of the box body 13. Moreover, the first positioning section 130 may mount on the side of the axial rod bearer 15 so that the second positioning section 140 now mounts on the side of the box body 13. In other words, the location of the first positioning section 130 and the second positioning section 140 may be reversed without affecting the height adjusting capacity of the structure 100.

Figure 6:
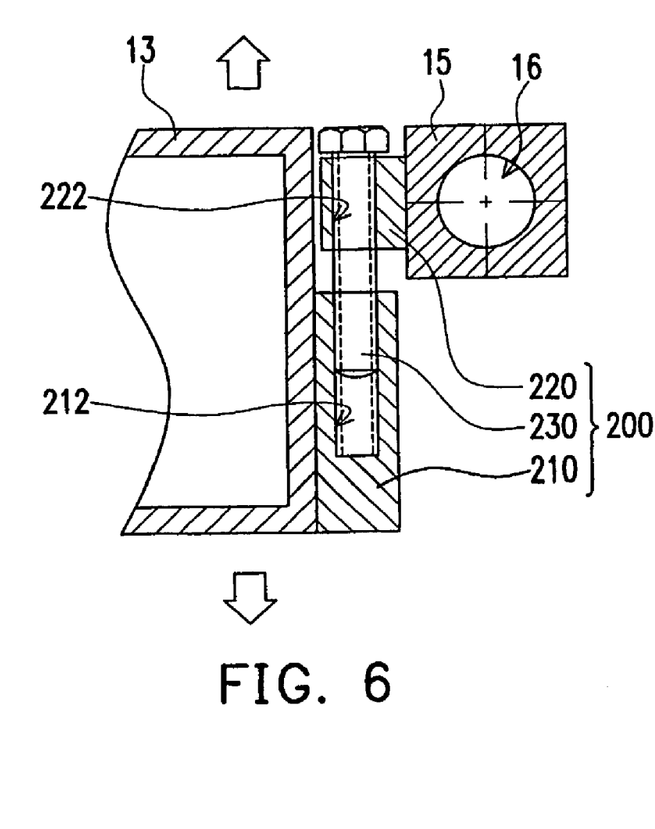
FIG. 6 is a schematic cross-sectional diagram showing a height adjustment structure according to a second embodiment of this invention.

FIG. 6 is a schematic cross-sectional diagram showing a height adjustment structure according to a second embodiment of this invention. As shown in FIG. 6, the height adjustment structure 200 comprises a first positioning section 210, a second positioning section 220 and a locking screw 230. The first positioning section 210 is attached to one side of a box body 13 facing an axial rod bearer 15. The second positioning section 220 is attached to one side of the axial rod bearer 15 facing the box body 13. The first positioning section 210 includes at least one threaded hole 212 having a central axis aligned in a direction perpendicular to the document panel 40 (as shown in FIG. 2). The second positioning section 220 includes at least a through hole 222 that aligns with the axis of the threaded hole 212. In addition, at least one locking screw 230 is provided. The locking screw 230 passes through the through hole 222 and screws into the threaded hole 212. The first positioning section 210 and the box body 13 may be fabricated together as a single component or locked together with screws. Similarly, the second positioning section 220 and the axial rod bearer 15 may be fabricated together as a single component or lock together with screws.

As shown in FIGS. 2 and 6, distance from the guiding rod 30 to the document panel 40 is normally fixed. If the screw 230 screws deeper into the threaded hole 212, the box body 13 is raised, thereby shortening the distance 44 from the optical system 10 to the document panel 40. Conversely, if the amount of screwing of the screw 230 into the threaded hole 212 is reduced, the box body 13 is lowered, thereby increasing the distance 44 from the optical system 10 to the document panel 40. In the meantime, the roller 18 or height of the underside 60 must be adjusted to match the adjusted box body 13 so that tilting of the box body 13 is prevented.

Hence, by adjusting the screwing depth of the screw 230 into the threaded hole 212, relative distance 44 in the vertical direction between the box body 13 and the axial rod bearer 15 can be adjusted. Ultimately, surface of a document 50 falls on the exact object distance of the internal lenses (not shown) inside the optical system 10. Thus, there is no need to redesign the assembly once another type of optical system is installed. In addition, since the pitch of the thread on the screw 130 is usually small, height level of the box body 13 may be more precisely adjusted.

Furthermore, to increase the vertical adjusting range of the box body 13, a longer threaded screw 230 may be used. Moreover, the first positioning section 210 may mount on the side of the axial rod bearer 15 so that the second positioning section 220 now mounts on the side of the box body 13. In other words, the location of the first positioning section 210 and the second positioning section 220 may be reversed without affecting the height adjusting capacity of the structure 200.

Figure 7:
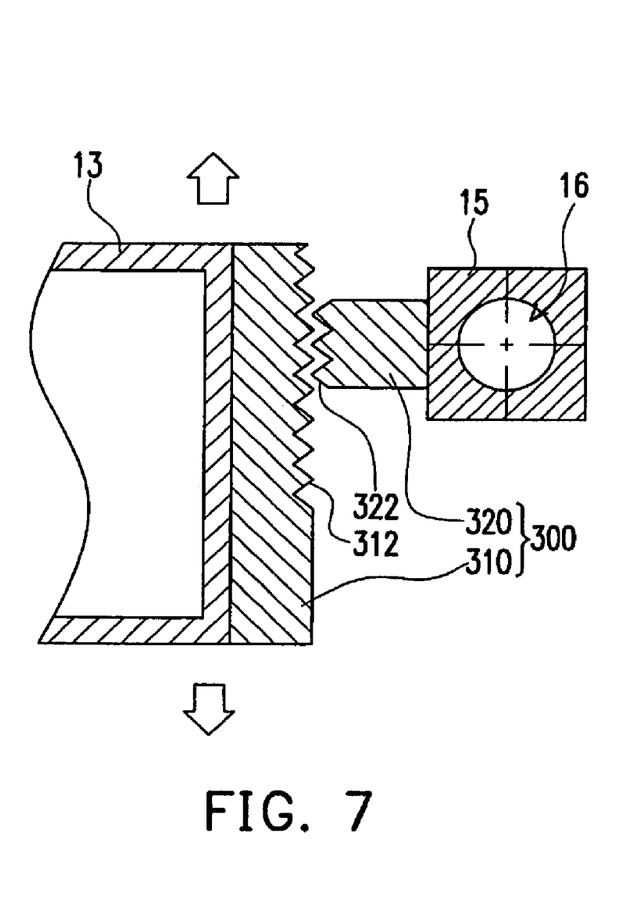
FIG. 7 is a schematic cross-sectional diagram showing a height adjustment structure according to a third embodiment of this invention.

FIG. 7 is a schematic cross-sectional diagram showing a height adjustment structure according to a third embodiment of this invention. As shown in FIG. 7, the height adjustment structure 300 comprises a first positioning section 310, a second positioning section 320 and an engaging component 330. The first positioning section 310 is attached to one side of a box body 13 facing an axial rod bearer 15. The second positioning section 320 is attached to one side of the axial rod bearer 15 facing the box body 13. The first positioning section 310 has a first set of teeth 312. The first set of teeth 312 protrudes from the first positioning section 310 away from the side along a vertical line. The second positioning section 320 has a second set of teeth 322 that matches the shape of the first set of teeth 312 and similarly protrudes from one side of the second positioning section 320. Since the first and the second set of teeth have matching profile, the first set of teeth 312 can mesh with the second set of teeth 322 and fix the first positioning section 310 and the second positioning section 320 relative to each other.

Figure 8:
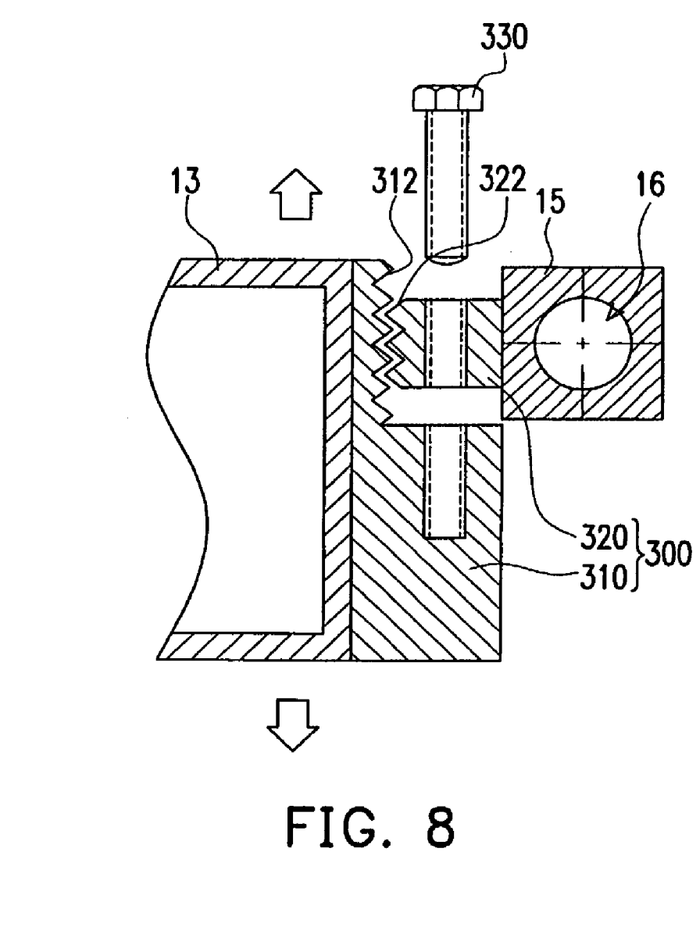
FIG. 8 is a schematic cross-sectional diagram showing a screw-lock mechanism used by the height adjustment structure in FIG. 7.

Reference is made to FIG. 8 in describing how the first positioning section 310 is fixed relative to the second positioning section 320, refer to FIG. 8. FIG. 8 is a schematic cross-sectional diagram showing a screw-lock mechanism used by the height adjustment structure in FIG. 7. After the teeth in first positioning section 310 and the teeth in the second positioning section 320 are engaged according to a set position, a screw 330 running in a vertical direction perpendicular to direction of the first and second set of teeth is used as a fixing element. The screw 330 locks up the first positioning section 310 and the second positioning section 320, thereby fixing their relative locations.

Figure 9:
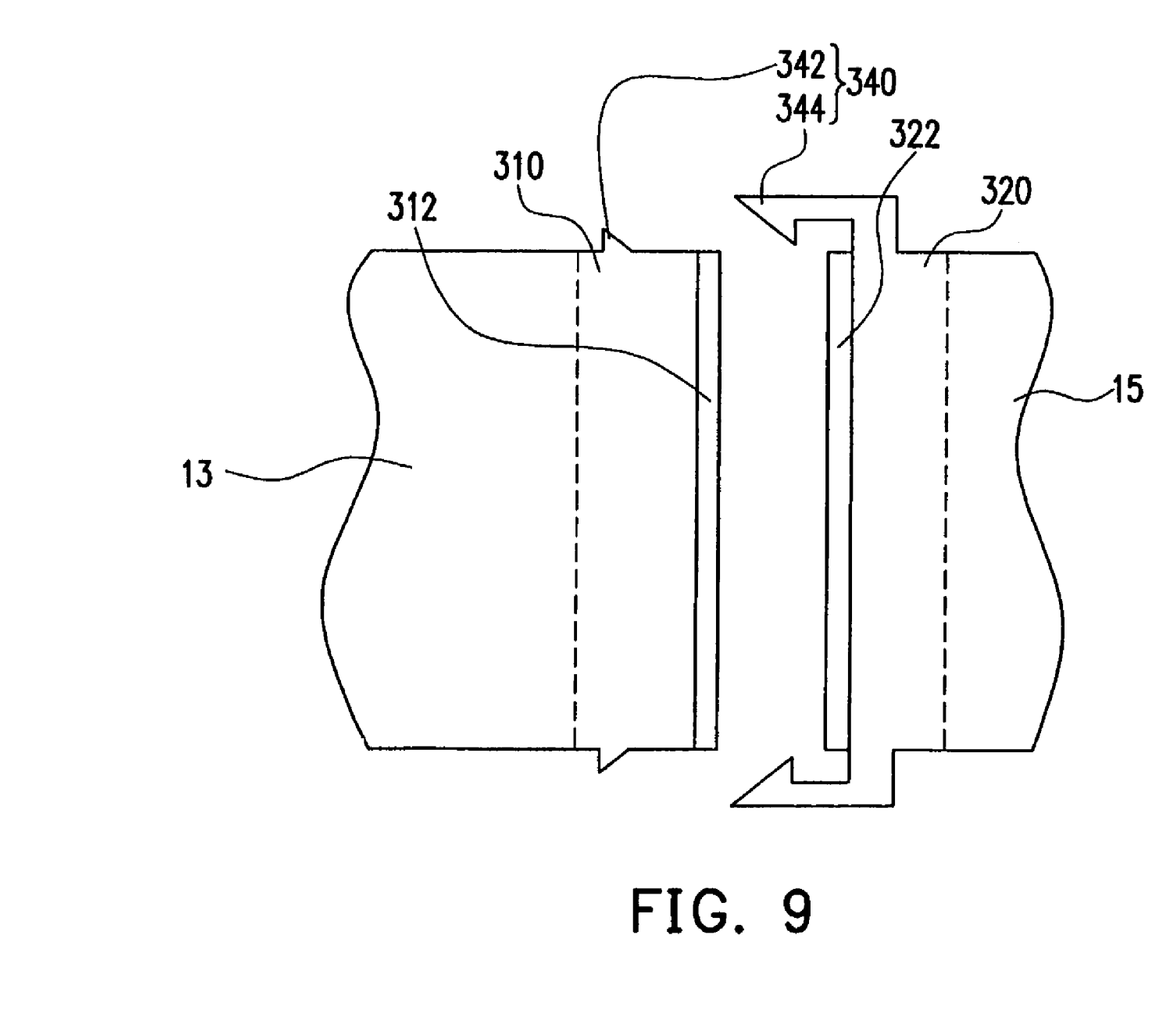
FIG. 9 is a schematic top view of a latching mechanism for fixing the relative position between the first and the second positioning sections in a height adjustment according to the third embodiment of this invention.

FIG. 9 is a schematic top view of a latching mechanism for fixing the relative position between the first and the second positioning sections in a height adjustment according to the third embodiment of this invention. To fix the relative position of the first positioning section 310 and the second positioning section 320, a pair of latching elements 340 is used The pair of latching elements 340 is a latching block 342 and a latching hook 344. The latching block 342 protrudes from the sides of the first positioning section 310 perpendicular to the protruding direction of the first set of teeth 312. The latching hooks 344 also protrudes from the sides of the second positioning section 320 perpendicular to the protruding direction of the second set of teeth 322. Therefore, after finding a suitable engagement position for engaging the first set of teeth 312 and the second set of teeth 322, the latching hooks 344 click onto the latching blocks 342. Hence, position of the first positioning section 310 relative to the second positioning section 320 of the height adjustment structure is locked.

As shown in FIGS. 2 and 7, distance from the guiding rod 30 to the document panel 40 is normally fixed. If the second set of teeth 322 meshes with the teeth near the bottom section of the first set of teeth 312, the box body 13 is raised thereby shortening the distance 44 from the optical system 10 to the document panel 40. Conversely, if the second set of teeth 322 meshes with the teeth near the top section of the first set of teeth 312, the box body 13 is lowered thereby increasing the distance 44 from the optical system 10 to the document panel 40. In the meantime, the roller 18 or height of the underside 60 must be adjusted to match the adjusted box body 13 so that tilting of the box body 13 is prevented.

Hence, by adjusting the meshing position of the teeth between the first set of teeth 312 and the second set of teeth 322, relative distance 44 in the vertical direction between the box body 13 and the axial rod bearer 15 can be adjusted. Ultimately, surface of a document 50 falls on the exact object distance of the internal lenses (not shown) inside the optical system 10. Thus, there is no need to redesign the assembly once another type of optical system is installed. In addition, if the pitch of the engaging teeth is small, height level of the box body 13 can be adjusted more precisely. Furthermore, to increase vertical adjusting range of the box body 13, the total number of teeth in the first set of teeth 312 may be increased. Moreover, the first positioning section 310 may mount on the side of the axial rod bearer 15 so that the second positioning section 320 now mounts on the side of the box body 13. In other words, the location of the first positioning section 310 and the second positioning section 320 may be reversed without affecting the height adjusting capacity of the structure 300.

In conclusion, major advantages of the height adjustment structure of this invention include:

1. The height adjustment structure can accommodate different types of platform scanner design so that identical optical system may be employed in different modular platform design.

2. The first embodiment of this invention uses a latching hook/plugging slot design. By setting the latching hook to engage with a particular plugging slot. Manual assembly is very much simplified, thereby boosting assembling speed.

3. The second embodiment of this invention uses a screw and a threaded hole design. Since screw threads usually have a fine pitch, distance from the document panel to the optical system can be accurately adjusted.

4. The third embodiment of this invention uses sets of meshing teeth to fix the position Since fine meshing teeth are usually used, height adjustment can be very precise.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
an optical system structure comprising:
a first positioning section, comprising a first portion of an engaging mechanism;
an axial rod bearer having a second positioning section, comprising a second portion of an engaging mechanism, wherein the first portion and the second portion of the engaging mechanism are adapted to be adjustably engaged; and
a guiding rod and a transmission device coupled to the axial rod bearer such that when the first portion and the second portion of the engaging mechanism are engaged, the optical system is adapted to travel along the guiding rod.

2. The apparatus of claim 1, wherein the engaging mechanism comprises one of a latching mechanism, a screwing mechanism and a teeth-lock mechanism.

3. The apparatus of claim 1, and further comprising a light source, a set of reflecting mirrors, a set of lenses and an optical sensor.

4. The apparatus of claim 1, wherein the first portion of the engaging mechanism comprises one or more plugging slots and the second portion of the engaging mechanism comprises one or more hooks configured to be at least partially inserted in the one or more plugging slots.

5. A method, comprising:
adjusting an optical system of a scanning device, wherein the optical system includes a body having a first positioning section, wherein the first positioning section includes a first portion of an engaging mechanism, and an axial rod bearer having a second positioning section, wherein the second positioning section includes a second portion of an engaging mechanism, substantially by a process comprising:
selectively positioning the body of the optical system relative to the axial rod bearer of the optical system;
engaging the first and second portion of the engaging mechanism to substantially fix the relative position of the body and the axial rod bearer; and
a guiding rod and a transmission device coupled to the axial rod bearer such that when the first portion and the second portion of the engaging mechanism are engaged, the optical system is adapted to travel along the guiding rod.

6. The method of claim 5, wherein the scanning device further includes a document panel and one or more lenses.

7. The method of claim 6, wherein the adjusting results in the body being adjusted relative to the document panel.

8. The method of claim 5, wherein the engaging mechanism comprises one of a latching mechanism, a screwing mechanism and a teeth-lock mechanism.

9. The method of claim 5, wherein the first portion of the engaging mechanism comprises one or more plugging slots and the second portion of the engaging mechanism comprises one or more hooks configured to be at least partially inserted in the one or more plugging slots.

\* \* \* \* \*

UNITED STATES PATENT AND TRADEMARK OFFICE
CERTIFICATE OF CORRECTION

| | |
|---|---|
| PATENT NO. | : 7,274,494 B2 |
| APPLICATION NO. | : 11/288662 |
| DATED | : September 25, 2007 |
| INVENTOR(S) | : Hsiao et al. |

Page 1 of 1

It is certified that error appears in the above-identified patent and that said Letters Patent is hereby corrected as shown below:

Title page, item [57] abstract, line 10, please replace "one side the axial" with --one side of the axial--.

Signed and Sealed this

Thirteenth Day of July, 2010

David J. Kappos
*Director of the United States Patent and Trademark Office*